March 25, 1924.

G. WILCOX 1,488,082

METHOD AND MACHINE FOR PREPARING FRUIT FOR CANNING

Filed Jan. 13, 1923    8 Sheets-Sheet 1

March 25, 1924.

G. WILCOX

METHOD AND MACHINE FOR PREPARING FRUIT FOR CANNING

Filed Jan. 13, 1923   8 Sheets-Sheet 2

1,488,082

March 25, 1924.

G. WILCOX

METHOD AND MACHINE FOR PREPARING FRUIT FOR CANNING

Filed Jan. 13, 1923   8 Sheets-Sheet 5

1,488,082

INVENTOR:
GEORGE WILCOX,
BY
Graham + Harris
ATTORNEYS

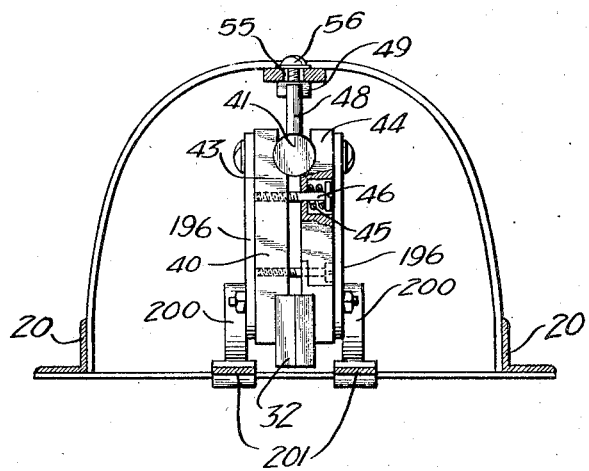
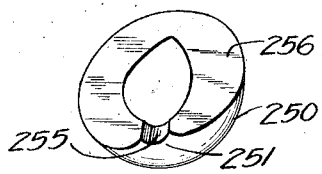

March 25, 1924.

G. WILCOX 1,488,082

METHOD AND MACHINE FOR PREPARING FRUIT FOR CANNING

Filed Jan. 13, 1923    8 Sheets-Sheet 7

INVENTOR:
GEORGE WILCOX,
BY
Graham + Harris
ATTORNEYS.

March 25, 1924.
G. WILCOX
1,488,082
METHOD AND MACHINE FOR PREPARING FRUIT FOR CANNING
Filed Jan. 13, 1923  8 Sheets-Sheet 8
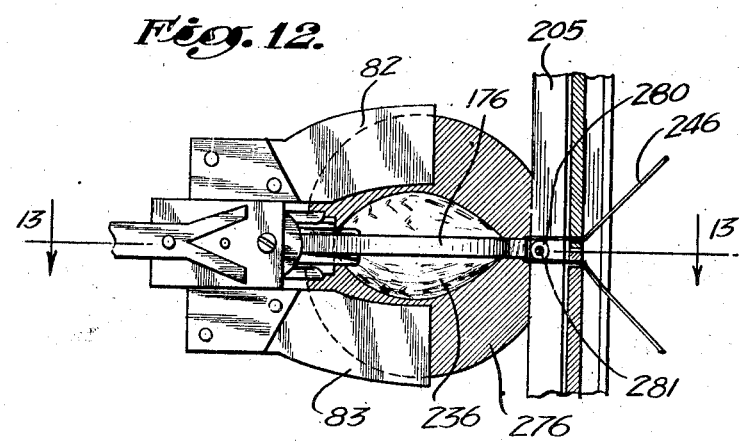
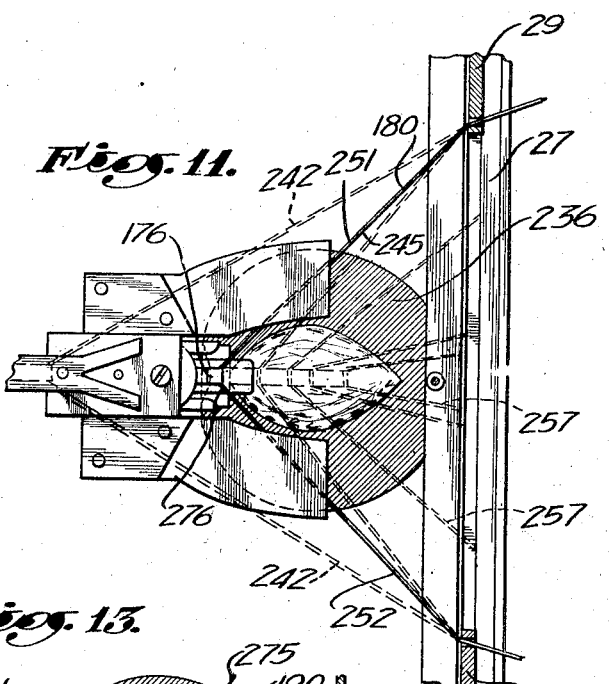
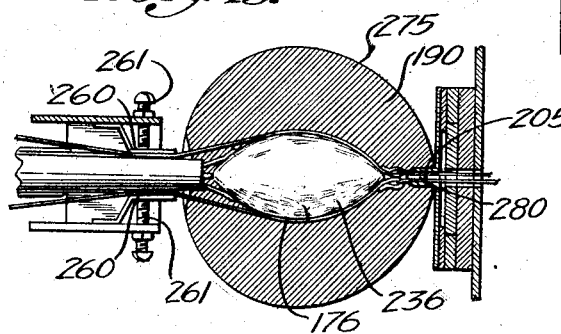
INVENTOR:
GEORGE WILCOX,
BY
Graham + Dunn
ATTORNEYS.

Patented Mar. 25, 1924.

1,488,082

UNITED STATES PATENT OFFICE.

GEORGE WILCOX, OF RIVERSIDE, CALIFORNIA, ASSIGNOR TO CALIFORNIA CANNING MACHINERY CO., A CORPORATION OF CALIFORNIA.

METHOD AND MACHINE FOR PREPARING FRUIT FOR CANNING.

Application filed January 13, 1923. Serial No. 612,510.

*To all whom it may concern:*

Be it known that I, GEORGE WILCOX, a citizen of the United States, residing at Riverside, in the county of Riverside and State of California, have invented a new and useful Method and Machine for Preparing Fruit for Canning, of which the following is a specification.

My invention relates to the fruit canning industry and relates particularly to a machine for halving and removing the stones from drupaceous fruits.

In the present practice of the art of fruit canning and preserving, deciduous fruits of the drupaceous, or stone, variety are canned in both whole and divided form. Peaches and plums when prepared with spices, and therefore termed spiced fruits, are customarily prepared whole with the stones remaining therein. This manner of canning fruit, however, constitutes but a very small part of the total amount canned, it being customary with the greater portion of canned fruits to remove the stones and to preserve them in sliced or halved form.

The drupaceous fruits are of two main divisions; the clingstone variety and the freestone variety. Apricots are freestone fruit while plums may be mostly considered as clingstone, owing to the fact that the meat thereof adheres to the seeds. Peaches are found in both clingstone and freestone varieties; the freestone peach being easily prepared for canning by dividing the peach and lifting out the stone thereof which is easily accomplished owing to the fact that the meat of the freestone peach does not adhere to the stone; while with the clingstone variety of peach considerable difficulty is encountered in preparing the fruit for canning owing to the fact that the meat adheres to the stone with considerable tenacity.

It is present practice to employ curved knives and other implements for the purpose of halving and removing the stones from clingstone peaches. This operation is necessarily very slow and costly and requires considerable skill if good appearance of the halved fruit is to be retained. An outstanding feature in the preparation of clingstone peaches is the large loss of meat which is left adhering to the stones, and the ragged and unsatisfactory appearance of the halved fruit when especial skill is not exercised in dividing it and removing the stones therefrom. From the foregoing, it will be recognized that principal cost of canning high grade clingstone peaches is in the dividing of and removing the stones from the fruit.

It is an object of my invention to provide a method whereby drupaceous fruits may be prepared in halved form without spoiling the appearance of the fruit and with a much less expenditure of labor than is now possible. This method has its particular utility in the preparation of clingstone fruits, making it possible to divide these fruits into perfectly formed halves and to remove the seeds therefrom with less waste of meat, and in less time, than is now possible by hand labor; but the method may also be employed with freestone types of fruit with a considerable saving of labor over the present methods of preparing such fruits.

My method of halving and removing the stones from these fruits consists essentially of drawing a pair of flexible wire loops through the fruit in such a manner that one of these loops passes upon each side of the stone therein and adheres to the contour of the stone, thus dividing the meat from the stone as it passes through the fruit.

It is a further object of the invention to provide a mechanical device in which the method above designated is employed. This device, as hereinafter set forth in the illustration of my improved method, provides an incisor upon which the article of fruit is initially placed, and loops which pass forwardly from the incisor into the incision made thereby and through the fruit in such a manner that it is divided into perfectly formed halves and the seed removed therefrom without waste of meat, this lack of waste being due to the fact that the wire loops are so guided that they adhere closely to the contour of the stone and thus cause separation of the meat from the stone close to the surface of the stone.

It is a further object of the invention to provide with such a device a means for continuously renewing the dividing loops in order to prevent crystallization and breakage thereof.

It is a further object of the invention to provide in the device a means for retracting the dividing loops after each operation thereof.

It is a further object of the invention to provide a pit or stone finder which directs the dividing loops over the stone in their proper courses.

It is a further object of the invention to provide an incisor element of the device in the form of a pair of blades having means associated therewith for spreading the dividing loops as they are retracted so that the loops will be lifted free from the pit finder as they are returned to their inoperative position.

It is a further object of the invention to provide in this device a means for removing the tips from certain classes of fruit, this removal of the tip being accomplished integrally with the dividing thereof.

The advantages of my invention and further objects thereof will be made evident hereinafter.

Referring to the drawings which are for illustrative purposes only:

Fig. 7 is an enlarged sectional view taken as indicated by the line 7—7 of Fig. 1.

Fig. 11 is an elevational view showing the dividing loops partly advanced into the incision formed in the peach by the blades of the incisor element.

Fig. 12 is a vertical sectional view similar to Fig. 11 showing the disposal of the dividing loops and the retractor element after the loops have been entirely drawn through the peach.

Fig. 13 is a sectional view taken upon a plane represented by the line 13—13 of Fig. 12 and showing the manner in which the retractor strips adhere to outer face of the stone when the loops are in advanced position.

Fig. 14 is a perspective view showing a half of a peach which has been divided and pitted by the device.

Figure 1:
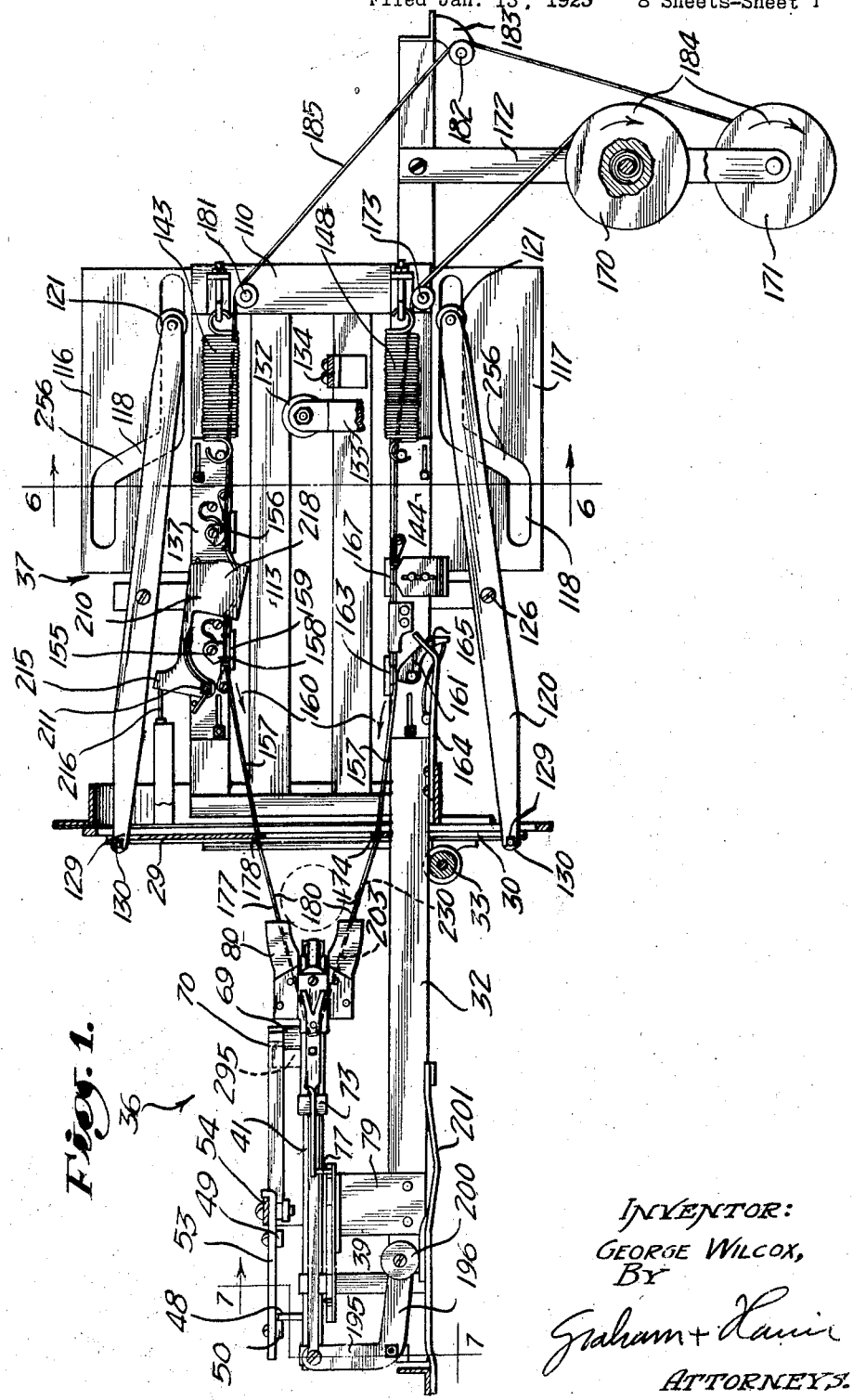
Fig. 1 is an elevational view partially in section showing the device with the carriage thereof disposed in inoperative position.
Figure 2:
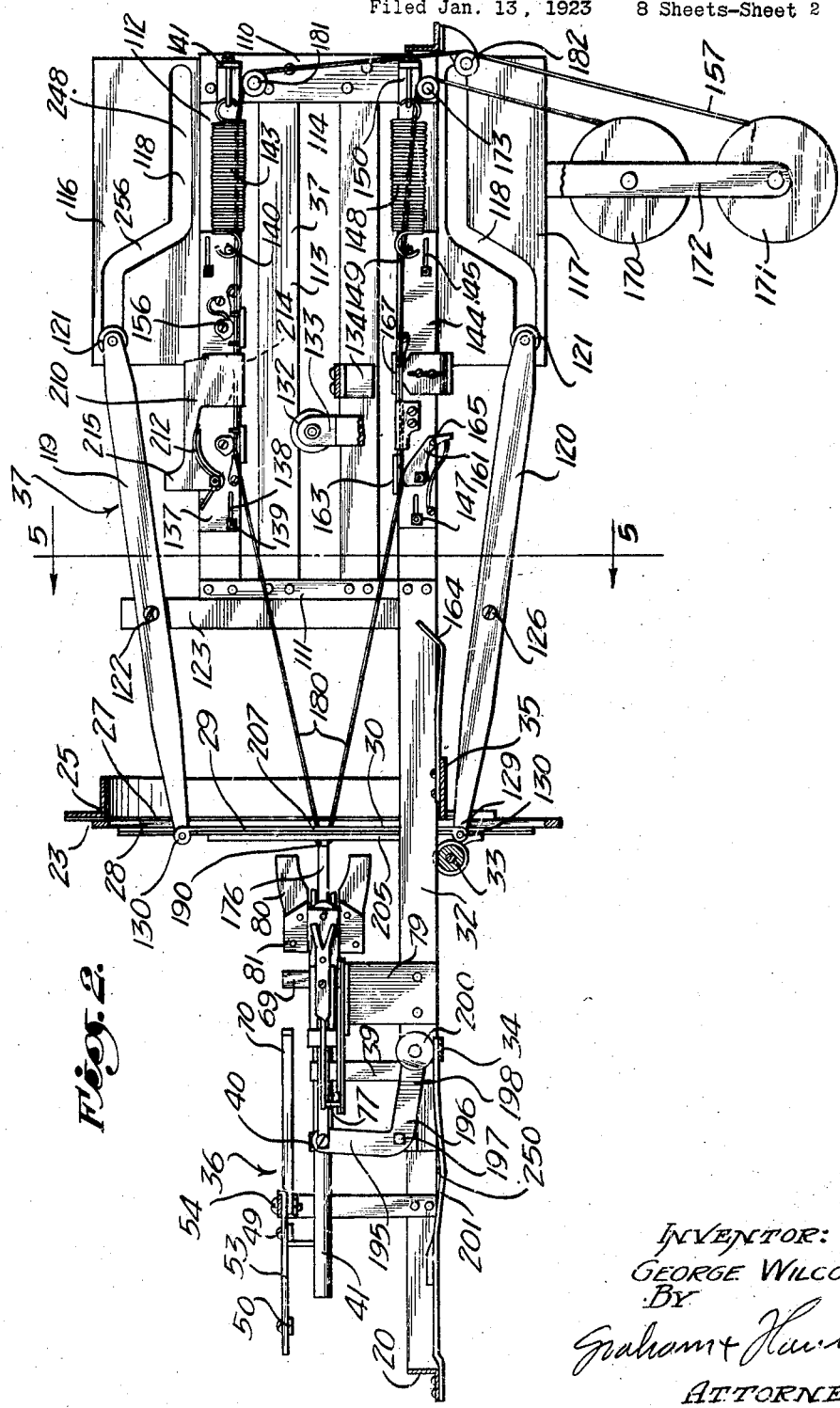
Fig. 2 is an elevational view similar to Fig. 1 showing the carriage thereof and the dividing loops in the advanced position they assume after operation upon a fruit.
Figure 5:
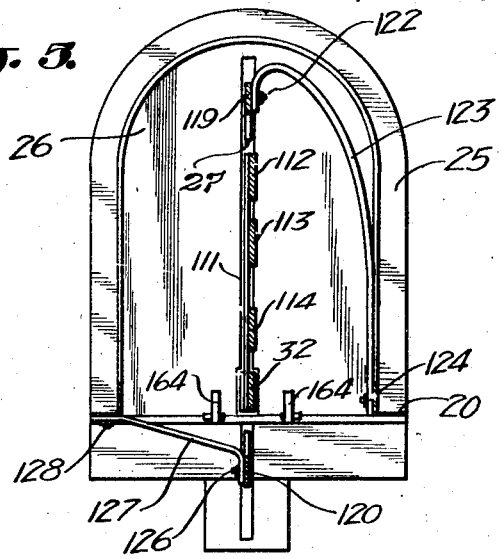
Fig. 5 is a section taken on a plane represented by the line 5—5 of Fig. 2.

With particular reference to Figs. 1 and 2 in which a complete assembly of the invention is shown, 20 represents a rectangular frame composed of side angle members 21 and end angles 22. Near the center of the frame 20 is mounted a vertical cutting board 23 which is comprised of an angle arch 25 having a plate 26, as shown in Fig. 5, across the front thereof. This plate having a vertical slot 27 therein and a slide mounted upon the front thereof in which upper and lower tucker bars 29 and 30 operate. Through the lower part of the plate 26 there extends a longitudinal bar 32 which is slidably supported upon a roller 33 and cross bars 34 and 35. This bar 32 constitutes the interconnecting element between the head structure 36 and the rearward structure 37 of the carriage 31 which is reciprocated from the forward position shown in Fig. 1 to the rearward position shown in Fig. 2 by connection of a link 38, shown in Fig. 3, with any common form of clutch actuated mechanism.

The head structure 36 provides a pair of upright members 39 and 40 which support a horizontal impaler bar 41. As shown also in Figs. 4 and 7, the impaler bar 41 is freely slidable through the support 39 but is frictionally engaged by the support 40 which comprises a pair of divided upright members 43 and 44 which are forced together by a spring 45 compressed by a screw 46 which passes through the member 44 and threads into the member 43. Extending upwardly from the bar 41 is a stop pin 48 which operates between a forward stop block 49 and a rearward stop block 50, as shown in Figs. 1 and 2. When the carriage is in the operation position, shown in Fig. 1, the supports 39 and 40 are disposed near the rear end of the bar 41. As the carriage moves forwardly from the position shown in Fig. 1 towards the position shown in Fig. 2, the bar 41 travels therewith owing to the frictional engagement, as shown in Fig. 7, of the members 43 and 44 of the supporting member 40 with the bar 41. This forward movement of the bar 41 continues until the stop pin 48 comes in contact with the forward stop block 49, whereupon the forward movement of the bar 41 is discontinued and the supports 39 and 40 then move forwardly upon the bar 41 into the position in which they are shown in Fig. 2.

It will be noticed in Fig. 2 that the supports 39 and 40 are disposed quite a distance forward upon the bar 41 when the carriage reaches the end of its forward stroke and is ready for its return stroke. Upon the return stroke of the carriage, the bar 41 moves rearwardly from the position shown in Fig. 2 until the stop pin 48 comes in contact with the rear stop block 50 whereupon the supports 39 and 40 slide along the bar 41 until the inoperative position in Fig. 1 is reached. The stop blocks 49 and 50 are mounted upon a horizontally extending plate 53, which is mounted upon an arched supporting bar 54, and has a longitudinal slot 55 therein through which the stop block screws 56 extend as shown in Fig. 7. The positions of the stop blocks may be adjusted upon the plate 53 to provide the desired limit travel.

Figure 4:
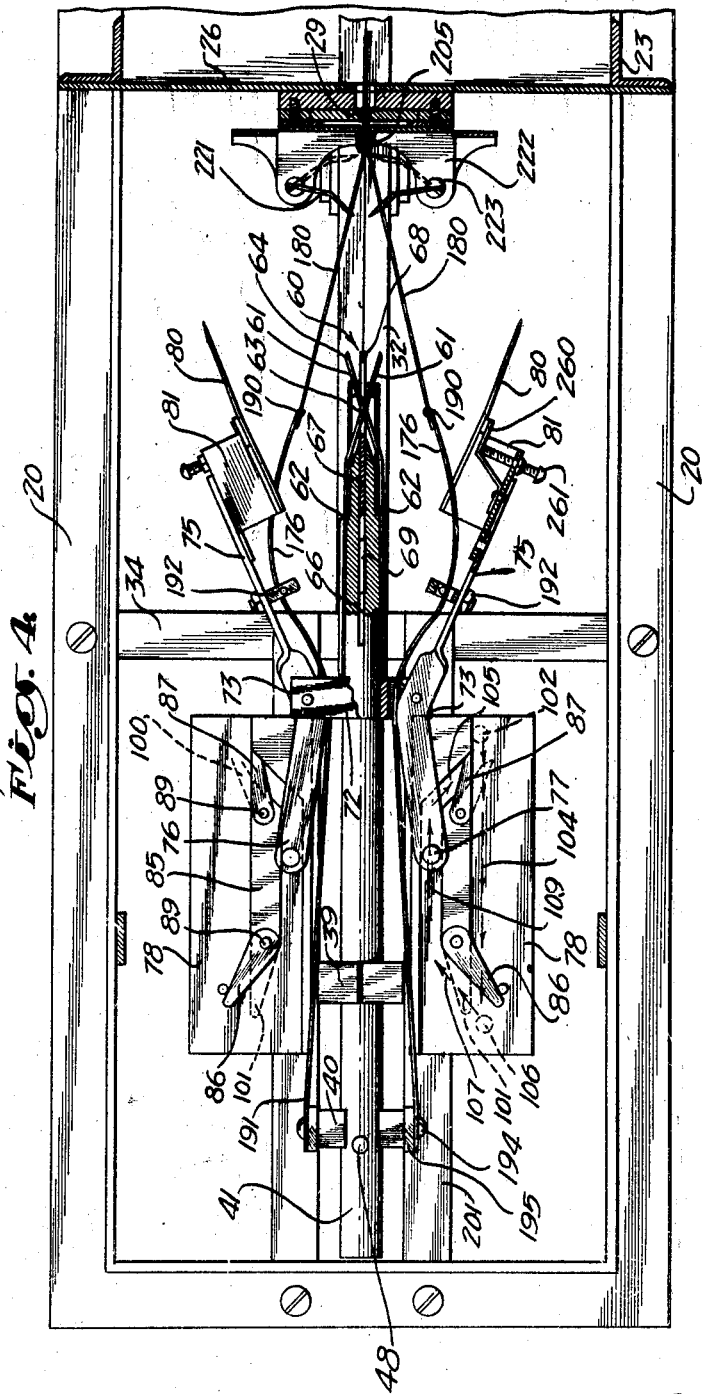
Fig. 4 is an enlarged plan view of the forward structure of the carriage showing the blades of the incisor element in the separated position which they assume as the carriage moves rearwardly after the dividing of the fruit, this separation being for the purpose of lifting the two halves away from the stone and the dividing loops, as they are returned to their inoperative position.

The forward end of the bar 41 is provided with a pit finder 60 which is formed of a pair of spring members 61 as shown in Fig. 4, these spring members being mounted upon the side of the bar as indicated at 62 and brought together at the forward end thereof as indicated at 63 and thereafter spread apart so that the ends 64 thereof are separated and thus provide a V shaped pocket therebetween. In a longitudinal slot 66 at the forward end of the bar 41 an ejector bar 67 is slidably situated. This ejector bar 67 when in its forward position is disposed as shown in Fig. 4 and has the forward end 68 thereof substantially in alignment with the ends 64 of the blades 61. The rearward end 69 of the ejector bar 67 extends upwardly as shown in Figs. 1 and 2, and is engaged by a stop 70 which is mounted upon the arched support 54 which also sustains the plate 53 holding the adjustment 49 and 50.

Figure 8:
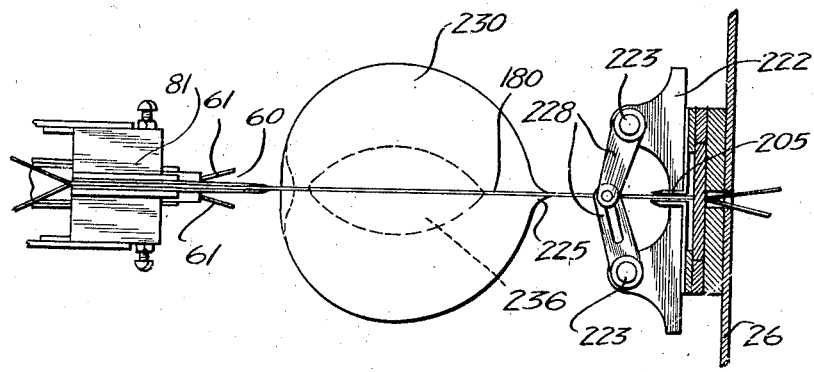
Fig. 8 is an enlarged fragmentary view showing a peach being placed between the dividing loops previous to being forced upon the incisor element.

By means of a fixture 72 having a pair of laterally extending forks 73 incisor levers 75 are pivoted upon each side of the bar 41. The rearward ends 76 thereof are each provided with downwardly extending pins 77 which engage cam plates 78 supported by vertical plates 79 upon the longitudinal bar 32 of the carriage. At the forward end of each of the levers 75 an incisor blade 80 is mounted by means of a cupped member 81 which extends inwardly over the pit finder 60 when the blades are closed together as shown in Fig. 8. As shown in Fig. 12, the blades 80 are each formed of an upper section 82 and a lower section 83 which extend forwardly above and below the pit finder, thus leaving a space therebetween to receive the stone when a peach, or other drupaceous fruit, is impaled upon the incisor element comprised of the blades 80.

Figure 3:
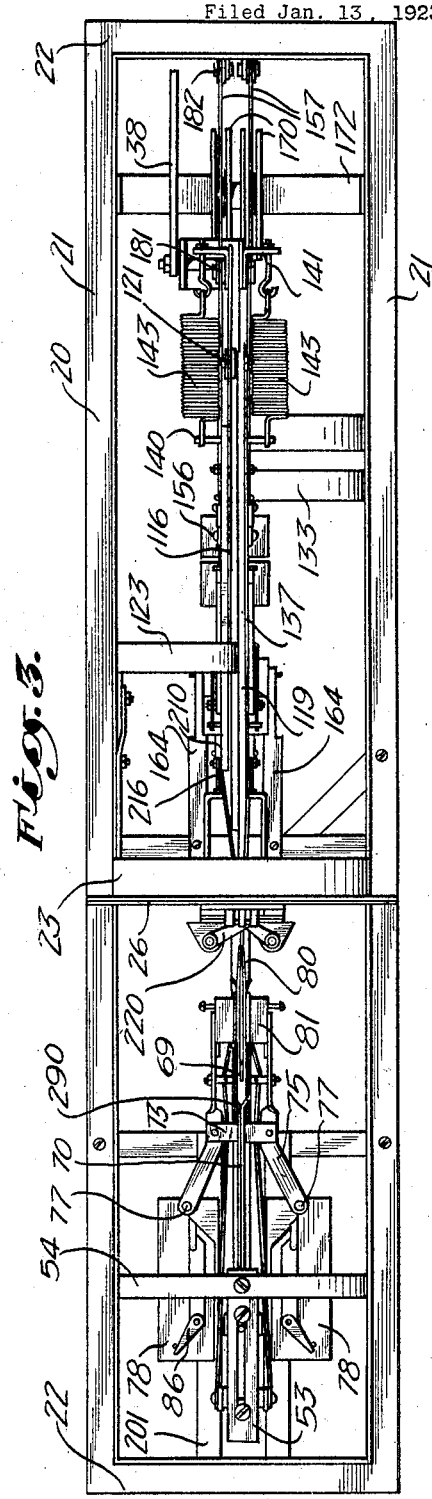
Fig. 3 is a plan view corresponding to Fig. 1, but showing the carriage thereof partly advanced.

The pins 77 are caused by the cam plates 78 to follow a polygonal course due to the presence of guides 85, each having a gate 86 at the rearward end thereof and a gate 87 at the forward end. These gates are mounted on pins 89 and are resiliently held in the position shown in full lines in Fig. 4 by springs, not shown, and are swingable against the action of these springs into the position indicated by the dotted lines 100 and 101. The cam plate 78 being mounted upon the longitudinal bar 32 of the carriage and thus establishes a relative movement between the cam plates and the pin 77 when the device is in the position of rest, the pins 77 occupy the positions at the forward ends of the plates 78 in which they are shown in Figs. 1 and 3. This position of the pin is also indicated in Fig. 4 by the dotted circles 102. It will be recognized that as the carriage moves forwardly, the entire head structure 36 moves forwardly as a whole until the pin 48 strikes the stop block 49, whereupon the impaler bar 41 and likewise the levers 75 mounted thereupon are stopped while the cam plate continues to advance underneath the pin 77, owing to the attachment of the cam plates to the bar 32.

As shown in Fig. 4, the pins 77, during the forward movement of the carriage 31, pass relatively rearwardly upon the cam plate 78 from the position indicated by the dotted lines 102 in the direction indicated by the arrows 104. The gates 87 being closed prevents the pins from dropping into the channel 105 and directs them along the outer faces of the upwardly projecting guide walls 85. As the plates continue to move forwardly the pin 77 engages the rear gates 86, and, forcing them inwardly into the positions indicated by the dotted lines 101, assume the positions at the rear ends of the cam plates indicated by the dotted circles 106 in Fig. 4, and the positions shown in Fig. 2 which illustrates the machine with the carriage thereof advanced in the forward position. Owing to the fact that the pins 77 ride upon the outside of the guide 85 during the forward stroke of the carriage, the blades 80 of the incisor element are maintained in closed positions, as indicated in Fig. 3, this closed position being due to the fact that the pins 77 are spread apart, thus holding the forward ends of the lever 75 inwardly.

As the carriage moves rearwardly on its return stroke, the impaler bar and the mechanism mounted thereupon moves therewith until the pin 48 strikes the rear stop block 50 whereupon the cam plates 78 move rearwardly beneath the pins with the result of a relative forward movement of the pins 77 upon the cam plates 78. As further illustrated in Fig. 4, the pins 77 in advancing relatively forwardly from the positions indicated by the dotted circles 106, strike the gates 86 and are deflected inwardly, as indicated by the arrow 107, thus forcing the pins 77 inwardly with the result that the forward ends of the levers 75 are spread apart and the incisor blades 80 brought into the positions indicated in Fig. 4. The pins 77 then travel forwardly in channels 109 upon the inside of the guide walls 85, and as the carriage approaches its rearward position, are deflected outwardly by the channels 105 which accomplishes the closing of the incisor blades. In passing through the channels 105, the pins 77 force the forward gates 87 open, as indicated by the dotted lines 100, and reassume the positions of rest indicated by the dotted circles 102.

The rearward structure 37 of the carriage is comprised of vertical members 110 and 111 which are mounted upon the longitudinal bar 32 and have cross bars 112, 113 and 114. Extending vertically from the rearward structure 37 are symmetric cam plates 116 and 117 having cam slots 118 therein for operating tucker levers 119 and 120 through the engagement of rollers 121 mounted upon the rearward ends of the levers 119 and 120 with the slots 118. The upper tucker lever 119 is pivoted at 122 upon a curved supporting bar 123 which is bolted at 124 to the frame 20, as shown in Fig. 5, and the lower tucker lever 120 is pivoted at 126 upon a supporting bracket 127 which is bolted at 128 to the forward longitudinal angle 21 of the frame 20. As shown in Fig. 1, the forward ends of the tucker levers 119 and 120 are provided with forks 129 which engage pins 130 in the extremities of the tucker bars 29 and 30.

Figure 6:
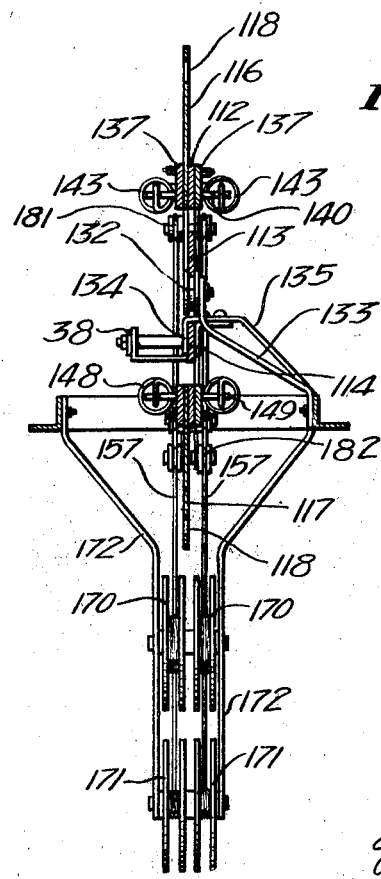
Fig. 6 is a section taken on a plane represented by the line 6—6 of Fig. 1.

As shown in Figs. 1, 2 and 6 a roller 132 mounted upon a bracket 133 supports the longitudinal bar 113, thus providing a rear lower support for the carriage. Means are further provided for holding the carriage in erect position. For this purpose I show forks 134 formed upon the end of a bracket 135, these forks 134 extending downwardly over the longitudinal member 114 of the rearward structure 37. Upon the lateral faces of the upper bar 112 of the rearward structure 37 plates 137 are mounted as shown in Figs. 1, 2 and 6. These plates are slotted as indicated at 138 in Fig. 2 and are supported upon screws 139 which pass through the slots 138 and thread into the bar 112. Between a pin 140 mounted upon each of the plates 137 and suitable brackets 141 mounted upon the upper end of the vertical member 110 tension springs 143 are employed for maintaining the plates 137 in the rearward positions in which they are shown. Likewise, directly below the plates 137 upon the longitudinal bar 32 plates 144 having slots 145 therein are similarly mounted upon screws 147 and held in rearward positions by springs 148 which extend between pins 149 mounted upon the plates 144 and fixtures 150 mounted upon the rearward structure 37. As indicated in Fig. 1 the upper plates 137 each have a forward clamping member 155 and a rearward clamping member 156 through which the upper extension of a wire 157 extends. These clamps consist of small eccentric members 158 which bear against anvils 159 and are disposed so as to prevent the wire from being moved therethrough in the direction of the arrow 160. An eccentric clamp 161 is likewise provided upon each of the lower plates 144 and is adapted to grip the lower extension of one of the wires 157 against anvils 163. These clamps 161 likewise prevent a movement of the wire 157 therethru in the direction of the arrow 160 when in clamping position, but are provided with means whereby the wire is released when the carriage is in forward position indicated in Fig. 1. This means of releasing the clamps 161 consists of a pair of cam fingers 164, one of which is disposed upon each side of the horizontal bar 32 and adapted to engage pins 165 upon the cams 161 when the carriage is in forward position, thus forcing the pins downwardly and rotating the clamps 161 so as to release the wires 157 passing therethrough. Retarding means 167 are also mounted upon each of the lower plates 144, which retarding members 167 frictionally engage the wires 157 and thus limit their speed of travel.

As shown in Figs. 1 and 6, each of the wires 157 has the ends thereof wound upon reel 170 and 171 mounted upon brackets 172 at the rear of the frame 20, a pair of these reels 170 and 171 being provided for each of the wires 157. The reel 170 has wound thereupon the new, unused wire which is threaded over a roller 173 mounted upon the carriage 37 and through the retarding means 167 and the clamp 161 from whence it extends through an eye 174 in the upper end of the lower tucker bar 30 and is then carried through a retractor element 176 which forms part of the head structure of the carriage. The wire 157 then extends rearwardly as indicated at 177 through the eye 178 formed in the lower end of the upper tucker bar 29, thus forming between the cutting plate 26 and the hand structure of the carriage a wire loop 180. From the eye 178 of the tucker bar 29, the wire threads through the clamps 155 and 156 mounted upon the upper plate 137 from whence it continues over a roller 181 mounted upon the vertical member 110, and over a roller 182 mounted by means of a bracket 183 upon the frame 20, to the reel 170. The reels 170 and 171 may be spring rotated or weight operated in the direction of the arrows 184 in order that the winding of the ends of the wire 151 thereupon may be maintained at all times throughout the operation of the machine.

In the operation of this machine this winding action of the reels 170 and 171 is preferable because the ends of the wire are being continuously unwound for a short distance and then allowed to rewind upon the roller. This will be evident from the inspection of Figs. 1 and 2. In Fig. 1 the carriage is disposed towards the front of the frame 20 and the wire 157 is pulled from the reels 170 and 171 as indicated at 185. When the carriage moves to the end of its cutting stroke, which position is shown in Fig. 2, the portion of the wire between the rollers 181 and 182 and between the roller 173 and the reel 170 is shortened, this shortening being taken up by the winding of the ends of the wire upon the roller, thus leaving no hanging portions of the wire 157.

As shown in Fig. 4 one of the loops 180 operates upon the right hand side of the pit finder and the other loop 180 operates upon the left hand side thereof. Likewise the ends of the wire 157 pass rearwardly through the slot 27 in the cutting board 26 and through the clamping members situated upon the right and left hand sides of the rearward structure 37 of the carriage. In forming the loops 180 the wires 157 pass through eyes 190 in the forward ends of the retractor members 176. These retractor members preferably consist of flat straps 191 which are carried back through guides 192 mounted upon the lever 75 and through the forks 73 of the fixture 72, and are attached by screws 194 to the upper ends of the upwardly extending arms 195 of bell cranks 196 which are mounted pivotally upon bolts 197 threaded into the rear supporting member 40. The laterally extending arm 198 of each bell crank 196 has a roller 200 mounted thereupon which rides upon a cam 201 situated to the side of the path traveled by the bar 32 as shown in Figs. 2 and 7.

When the machine is disposed in operative position the loops 180 extend back between the blades 80 of the incisor element as indicated by the dotted lines 203 in Fig. 1. Upon the forward movement of the carriage, the head structure 36 moves forwardly into the intermediate position shown in Fig. 3, which is the position at which the pin 48 comes into engagement with the stop 49 and thus prevents further forward movement of the impaler bar 41. The carriage continues to move forwardly, thus advancing the loop between the blades 80 of the incisor element and carrying it into the position shown in Fig. 2. When the carriage has reached the end of its stroke, as shown in Fig. 2, the eye 190 of each retractor element 176 rests against the ends of the divided blade 205, which is mounted upon the front of the cutting board 26 and between which the loops 180 pass. During the forward movement of the carriage the rollers 121 of the tucker levers 119 and 120 advance outwardly in the cam slots 118, thus causing the tucker bars 29 and 30 to be brought together so that when the parts of the machine are disposed as shown in Fig. 2 the tucker bars are brought together as indicated at 207.

If two loops of wire were continuously employed as the dividing loops 180, the continued stresses thereupon would in time cause the crystallization of the wire with the result that breakage would occur. My invention provides a means for slightly advancing the wires 157 from which the loops 180 are formed, thus gradually renewing the loops. This advance of the wires 157 is accomplished by means of a pair of advancing levers 210, one each of which is pivoted upon a bolt 211 to one of the plates 137. These advancing levers 210 are maintained normally in the upward position shown in Fig. 2 by means of springs 212. In each of the levers a channel 214 is formed through which the wires 157 are passed. The advancing operation of the mechanism 210 is accomplished in the following manner:

As the carriage approaches its return stroke after each operation, the arm 215 of the lever 210 comes against a stop 216 which forces the arm 218 of the lever downwardly and depresses those portions of the wires 157 which extend between the clamps 155 and 156. Owing to the fact that the clamps 155 and 156 are arranged to prevent a movement of the wire 157 in the direction of the arrow 160 but to allow the movement of the wire in a direction opposite to the arrow 160 the depression of the lever 210 causes the wire to be drawn in through the clamp 155 to accommodate for the increased length required by the depression of the central portion of the wire between the two clamps. During the time that the carriage is in the position shown in Fig. 1 the clamp 161 is released due to the engagement of the cam arm 164 with the pins 165, and the lower extension of wire is permitted to move freely through the clamp 161 and the loop thus advanced when the lever 210 is depressed. As the carriage moves forwardly the lever 210 raises and the depressed portion of the wire 157 between the clamps 155 and 156 is pulled through the clamp 156 by the tension exerted upon the upper extension of the wire by the reel 171. It will be perceived that the advance of the wires 157 forming the dividing loops 180 can occur only when the carriage is in the position shown in Fig. 1, as at this time only is the clamp 161 released from the wire so that it may be moved therethrough. During the cutting action of the loops 180 the clamp 155 and 156 and the clamps 161 grip the wires 157 firmly. The stop 216 is adjustable to provide varied amounts of movement in the advancing lever 210 in order that adjustment of the advance in the wires 157 may be accomplished.

The invention is particularly suited to the halving of peaches and is particularly suited to operations upon clingstone peaches. Some of these peaches have tip formations thereupon which must be removed in preparation for canning. When in use with such peaches my invention provides a tip remover having a pair of vertically disposed blades 221 mounted by brackets 222, and swingable upon vertical shafts 223 from the forward positions shown in Figs. 4 and 9 to the retracted positions thereof shown in Figs. 3 and 10. These blades are forwardly curved, and the tips 225 of the peaches, being operated upon in the machine, are received between the edges of the two blades 223 and are cut off as the peach advances forwardly and the blades swing through arcs indicated by the dotted lines 226. The upper ends of the shafts 223 are joined together by interconnected levers 228 which synchronize the swing of the blades so that they will swing together through the arcs 226.

Figure 9:
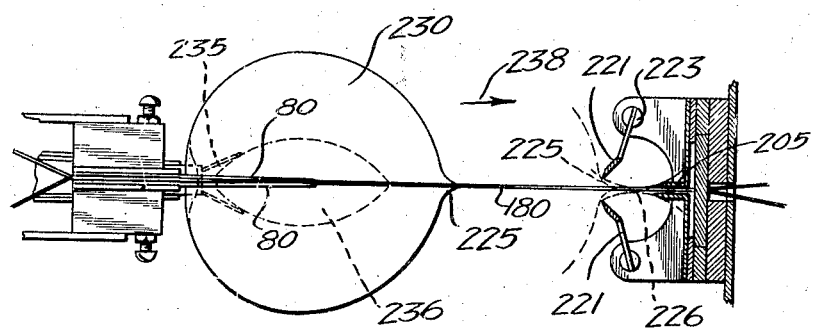
Fig. 9 is a view similar to Fig. 8 showing the peach impaled upon the incisor element.
Figure 10:
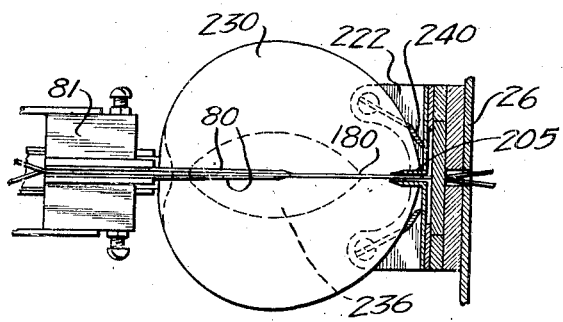
Fig. 10 is a view similar to Fig. 8 showing the first operation of the machine, which is the advancing of the peach against the cutting board and the removal of the tip therefrom.

In the utilization of the device a peach is placed within the loops as indicated by the dotted circle 230 in Fig. 1. In the enlarged view, Fig 8, the loops and the mechanism are represented in plan and the peach 230 is shown beneath the upper portions of the loops 180. In the structure of most drupaceous fruits a distinct circumferential line will be found extending around the peach from the stem end thereof to the tip 225. It will also be found that the stone of the fruit is of flattened oval shape and lies in a plane with this circumferential line, which I designate as the seed meridian of the peach owing to the fact that it designates the plane in which the seed lies within the fruit. In freestone fruits such as freestone peaches and apricots, the fruit may be readily divided upon this line, and the stone lifted out of the seed cavity. It will also be noticed that this seed meridian does not always lie in a central plane with respect to the fruit, but may be considerably to the side thereof; but it will always be found that this meridian designates the plan in which the seed lies and it therefore follows where the meridian is to one side that the seed will also be situated to one side. Therefore, in the placing of the peach 30 in the loops 180 the seed meridian is brought into a position coinciding with the vertical plane designated by the loops 180. The peach 230 is then pulled rearwardly, causing the incisor element which consists of the incisor blades 80 in closed positions as shown in Figs. 8 and 9, to enter the peach above and below the seed. The blades 61 of the pit finder 60 enter the peach as indicated at 235 in Fig. 9 and engage the stone 236. The blades 61, as hereinbefore described, are resiliently disposed so that they may adapt themselves to the shape and size of the stone. If the stone is quite large, the blade 61 is spread somewhat apart and extends to each side of the stone as indicated in Fig. 9. When the fruit is thus impaled upon the incisor and the pit finder 60 the operating clutch, not shown, is actuated, thus causing the carriage to advance from the position shown in Fig. 1 to the position shown in Fig. 2 and to then return to its original position Fig. 1. As the head structure moves forwardly, the peach 230 is carried in the direction indicated by the arrow 238 in Fig. 9 with the result that the tip 225 enters between the blades 221 of the tip remover. The further forward movement of the carriage causes the peach to be carried into the position shown in Fig. 10. The pressure of the peach against the blades 221 of the tip remover causes these blades to swing inwardly into the position indicated at 240 in Fig. 10 with the result that the tip is cut from off the peach. The movement of the impaler rod 41 stops at this point, but the movement of the carriage and of the dividing loops 180 supported thereby continues until the full movement of the carriage is accomplished.

In Fig. 11, the dotted lines 242 represent in elevation the position of the loops when the impaler bar has reached the end of its forward movement. After the stopping of the impaler bar 41 the incisor element and pit finder mounted thereupon, the loops 180 advance with the carriage through the position indicated in full lines 245 in Fig. 11 to the position indicated in full lines 246 in Fig. 12. It will be perceived that during the initial movement of the carriage the rollers 121 of the tucker levers 119 and 120 ride in the horizontal portion 248 of the cam slots 118, indicated in Fig. 2. Consequently, there is no movement of the tucker bars 29 and 30 with the result that the loops are spread apart at greater angles than when in the position of rest indicated by the dotted lines 242. Therefore a greater length of wire 157 is required in the loops at this time. This requirement is accommodated by a forward travel of the retractor elements 176 which is accomplished by the rollers 200 of the cranks 196 dropping into the depressions 250 of the cams 201 shown in Fig. 2, thus allowing the upwardly extending arms 195 of the ball cranks 196 to swing forwardly, allowing a forward relative movement of the retractor elements. As the retractor elements 176 are initially drawn into the peach, as indicated in Fig. 11, the legs 251 and 252 of the loops 180 are spread apart at a considerably greater angle than when the machine is in inoperative position, with the result that the retractor elements are pulled into the peach, as indicated in Fig. 11, simultaneously with the entrance of the dividing loops 180 into the incisions formed by the plates 80.

At the time the loops 180 reach the position shown in Fig. 11 the diagonal portions 256 of the cam slots 118 shown in Fig. 1 come into operation upon the tucker levers 119 and 120, causing the loops to advance inwardly substantially as indicated by the dotted lines 257 in Fig. 11. The inward movement of the tucker bars 29 and 30 is very rapid during this portion of the operation of the machine and causes the loops 180 to be rapidly constricted so that the portions 251 and 252 thereof are brought downwardly into the peach very rapidly, with the result that a substantially closed loop is formed considerably before the retractor elements 176 have passed across the faces of the stone 236 into position against the divided blades 205 as shown in Fig. 12. As shown in the sectioned plan view Fig. 13 confining elements 260 are provided which are adjusted by screws 261 and hold the retractor elements 176 inwardly against the springs 61 of the pit finder 60. The holding of the retractor elements by the elements 260 causes the retractor elements and the central portions of the loops to adhere very closely to the surface of the stone.

The incisor element, comprised of the cooperating blades 80, rests in the same plane as the slots 27 in the plate 26 and as the space between the divided blades 205. Therefore, the dividing loops are guided into the peach between the blades 80 in a vertical plane and the portions 251 and 252 thereof are drawn through the peach in this vertical plane owing to the guiding action of the tucker bars 29 and 30, thus causing the meat or edible portion 275 to be divided substantially upon a flat vertical plane. As the loops 180 are drawn into the peach, the central portion of each loop as indicated at 276 in Fig. 11 is guided outwardly by one of the blades 61 of the pit finder, or centralizer, and passes over the face of the stone 236 as indicated by the dotted lines 257, thus causing the seed to be separated from the meat at the surface of the seed. The tension in the loops 180 causes the central portions 276 of the loops to adhere very closely to the contour of the seeds with the result that the meat is entirely removed from the seed. During the forward movement of the loops the retractor element 176 is drawn from the position shown in Fig. 11 over the lateral faces of the seed 236 as shown in Figs. 12 and 13. As the eyes 190 of the retractor element approaches the divided blades 205 they are drawn inwardly by the confinement of the loops between the blades 205 and therefore adhere very closely to the stone as shown in the plan view, Fig. 13.

In order to prevent the ends of the retractor elements being drawn in between the blades 205 and thus causing the blades to be spread apart I provide a small washer 280 and a rivet 281 which passes through the blades 205 and secures the washer 280 between the blades so that it may serve as a spacer for the blades and a stop against which the ends of the retractor elements 176 may operate.

The position of the loops 180 shown in Figs. 12 and 13 is reached at the end of the forward travel of the carriage; therefore during the forward travel of the carriage, the entire cutting operation upon the peach is accomplished. As the carriage moves rearwardly the blades are opened as shown in Fig. 4, by the engagement of the pin 77 with the cam plate as hereinbefore explained, thus causing the halves of the peach to be separated, and causing the lifting of the retractor elements 176 and the loops 180 away from the stone 236 in order that the stone may be readily ejected by the ejector 67. The action of this ejector may be explained by reference to Fig. 3. The upwardly extending portion 69 of the ejector as shown in Figs. 1 and 4 is engaged by the member 70 which is comprised of two forked spring members bent outwardly at their forward ends as indicated at 290. When the upwardly projecting rearward end 69 of the ejector strikes the member 70 in its rearward movement, and as the impaler bar 41 moves rearwardly, the end 68 of the ejector 67 is moved relatively forwardly with respect to the impaler bar 41 into the position shown in Fig. 4 with the result that the stone is forced from between the blade 61 of the pit finder 60. When a peach is being forced upon the incisor element and the pit finder, the ejector 67 is forced back in the slot 66, the upwardly projecting end 69 being forced in between the spring members comprising the stop member 70, as indicated by the dotted lines 295 in Fig. 1.

The springs 143 and 148 which resiliently maintain the plates 137 and 144 in the positions in which they are shown in Fig. 2 provide an adjustable means for drawing the loops 180 through the fruit. These springs 143 and 148 are of sufficient strength to draw the loops through a peach under ordinary conditions but may stretch when undue resistance to the passage of the loop through the peach is encountered, such as the catch of a loop upon a stone or the twisting sideways of a stone due to the improper placement of the peach upon incisor or improper centralizing of the pit finder upon the stone, thereby preventing the breakage of the loops by allowing the loops to remain stationary while the rearward structure 37 completes its rearward travel.

Although my invention is particularly adapted to preparing clingstone fruits for canning and especially designed for this purpose, it may be employed with various drupaceous fruits and by its use the labor cost of the halving of the fruit and the removal of the stones thereof will be very materially reduced.

In Fig. 14 is shown a half 250 of a peach which has been prepared for canning by use of the machine illustrated. As hereinbefore mentioned, the loss of meat, due to adherence to stone of peach, is very small, the only loss being at the stem end 251 of the peach where the pit finder 60 is forced into the end of the peach. The removal of this small portion of the meat by the pit finder 60, leaves a semi-circular channel 255, but the remainder of the half 250 is left substantially intact, as illustrated in Fig. 14, the cutting action of the loops 180 leaving a smooth, clean-cut surface 256, having no ragged edges to detract from the appearance of the peach.

As shown in Fig. 2, the spreading of the incisor blades 80 accomplishes also the spreading of the retractor elements 176 and the loops 180, thus removing the liability of the loops catching upon the pit-finder 60 as they are returned by the retractors.

Although the invention has been herein described in the preparation of fruit for canning, it will be understood that it may be employed in preparing fruits for other purposes, such as the drying thereof; therefore I desire that the scope of the invention be limited only by the appended claims.

I claim as my invention:

1. The method of preparing drupaceous fruit which includes drawing a flexible loop through the fruit in such a manner that the loop passes across the surface of the stone and in substantial contact therewith, thereby severing the meat of the fruit from the stone.

2. The method of preparing drupaceous fruit which includes drawing an open flexible loop into one side of the fruit and constricting said loop as it is drawn forwardly towards the other side of said fruit and across the surface of the stone, to sever the meat of the fruit from the stone.

3. The method of preparing drupaceous fruit which includes: drawing an open flexible loop into one side of the fruit; drawing said loop forwardly diametrally across the fruit; and retarding the central portion of the loop so as to cause the flattening of the loop and the drawing of the loop into the top and bottom of the fruit as it advances across the fruit.

4. The method of preparing drupaceous fruit which includes: drawing an open flexible loop into one side of the fruit; drawing said loop forwardly diametrally across the fruit; retarding the central portion of the loop so as to cause the flattening of the loop and the drawing of the loop into the top and bottom of the fruit as it advances across the fruit; and constricting said loop as it is drawn forwardly.

5. The method of preparing drupaceous fruit which includes drawing flexible loops through the fruit in such a manner that the loops are passed around two opposite sides of the stone thereof and follow the contour of the stone as they pass thereover.

6. The method of preparing drupaceous fruit which includes: incising one side of the fruit; drawing flexible loops into the incision thus formed and centrally across the fruit; and guiding said loops in such a manner that one of said loops passes around one side of the stone and the other of said loops passes around the other side of said stone.

7. The method of preparing drupaceous fruit which includes: incising one side of the fruit; drawing flexible loops into the incision thus formed and centrally across the fruit; guiding said loops in such a manner that one of said loops passes around one side of the stone and the other of said loops passes around the other side of said stone; and constricting said loops as they are drawn forwardly.

8. The method of preparing drupaceous fruit which includes: incising one side of the fruit; drawing flexible loops into the incision thus formed and centrally across the fruit; retarding the centers of said loops to cause them to assume flattened form and thus be drawn into the top and bottom of the fruit; and guiding said loops in such a manner that one of said loops passes around one side of the stone and the other of said loops passes around the other side of said stone.

9. The method of preparing drupaceous fruit which includes: incising one side of the fruit; drawing flexible loops into the incision thus formed and centrally across the fruit; retarding the centers of said loops to cause them to assume flattened form and thus be drawn into the top and bottom of the fruit; guiding said loops in such a manner that one of said loops passes around one side of the stone and the other of said loops passes around the other side of said stone; and constricting said loops as they are drawn forwardly.

10. The method of preparing drupaceous fruit which includes drawing a flexible loop through the fruit, in plane with the seed meridian thereof, in such a manner that the loop passes around and across the surface of the stone in substantial contact with said surface.

11. The method of preparing drupaceous fruit which includes drawing flexible loops through the fruit substantially along the seed meridian thereof and in such a manner that the loops are passed around two opposite sides of the stone thereof and follow the contour of the stone as they pass thereover.

12. The method of preparing drupaceous fruit which includes: incising one side of the fruit along the seed meridian; drawing flexible loops into the incision thus formed and centrally across the fruit; and guiding said loops in such a manner that one of said loops passes around one side of the stone and the other of said loops passes around the other side of said stone.

13. The method of preparing drupaceous fruit which includes: incising one side of the fruit along the seed meridian; drawing flexible loops into the incision thus formed and centrally across the fruit; guiding said loops in such a manner that one of said loops passes around one side of the stone and the other of said loops passes around the other side of said stone; and constricting said loops as they are drawn forwardly.

14. The method of preparing drupaceous fruit which includes: incising one side of the fruit along the seed meridian; drawing flexible loops into the incision thus formed and centrally across the fruit; retarding the centers of said loops to cause them to assume flattened form and thus be drawn into the top and bottom of the fruit; and guiding said loops in such a manner that one of said loops passes around one side of the stone and the other of said loops passes around the other side of said stone.

15. The method of preparing drupaceous fruit which includes: incising one side of the fruit along the seed meridian; drawing flexible loops into the incision thus formed and centrally across the fruit; retarding the centers of said loops to cause them to assume flattened form and thus be drawn into the top and bottom of the fruit; guiding said loops in such a manner that one of said loops passes around one side of the stone and the other of said loops passes around the other side of said stone; and constricting said loops as they are drawn forwardly.

16. The method of preparing drupaceous fruits which includes: forcing a finder into the fruit and into engagement with the seed thereof; and drawing a flexible loop into said fruit on each side of said finder and centrally across the fruit.

17. The method of preparing drupaceous fruit which includes: forcing a pit-finder into the fruit at a point on the seed meridian of the fruit; incising the fruit along the seed meridian adjacent to said pit-finder; drawing a pair of loops into the incision thus formed, one of said loops entering on each side of said pit-finder; and guiding said loops in such a manner that one of said loops passes around one side of the stone and the other of said loops passes around the other side of said stone.

18. The method of preparing drupaceous fruit which includes: forcing a pit-finder into the fruit at a point on the seed meridian of the fruit; incising the fruit along the seed meridian adjacent to said pit-finder; drawing a pair of loops into the incision thus formed, one of said loops entering on each side of said pit-finder; retarding the centers of said loops to cause them to assume flattened form and thus be drawn into the top and bottom of the fruit; guiding said loops in such a manner that one of said loops passes around one side of the stone and the other of said loops passes around the other side of said stone; and constricting said loops as they are drawn forwardly.

19. In a machine for halving drupaceous fruits, the combination of: a flexible loop; and means for drawing said flexible loop entirely through a fruit and across and in substantial contact with the surface of the stone therein.

20. In a machine for halving drupaceous fruits, the combination of: a flexible loop; means for drawing said flexible loop entirely through a fruit and across and in substantial contact with the surface of the stone therein; and means for holding said fruit in position in said machine.

21. In a machine for halving drupaceous fruits, the combination of: a flexible loop; an incisor for incising the fruit; and means for drawing said loop into the incision thus formed and through said fruit.

22. In a machine for halving drupaceous fruits, the combination of: a flexible loop; an incisor for incising the fruit; means for drawing said loop into the incision thus formed and through said fruit; and a retractor for returning said loop to its original position previous to the dividing of said fruit.

23. In a machine for halving drupaceous fruits, the combination of: a flexible loop; an incisor for incising the fruit; means for drawing said loop into the incision thus formed and through said fruit; a retractor for returning said loop to its original position previous to the dividing of said fruit; and means for advancing the flexible element forming said loop.

24. In a machine for halving drupaceous fruits, the combination of: a flexible loop; an incisor for incising the fruit; means for drawing said loop into the incision thus formed and through said fruit; a retractor for returning said loop to its original position previous to the dividing of said fruit; means for advancing the flexible element forming said loop; and guide members for maintaining said loop substantially in a fixed plane throughout its movement.

25. In a machine for halving drupaceous fruits, the combination of: a flexible loop; means for drawing said flexible loop entirely through a fruit and across and in substantial contact with the surface of the stone therein; and a tucker for constricting said loop as it is drawn through said fruit.

26. In a machine for halving drupaceous fruits, the combination of: a flexible loop; an incisor for incising the fruit; means for drawing said loop into the incision thus formed and through said fruit; a retractor for returning said loop to its original position previous to the dividing of said fruit; means for advancing the flexible element forming said loop; guide members for maintaining said loop substantially in a fixed plane throughout its movement; and a tucker for constricting said loop as it is drawn through said fruit.

27. In a machine for halving drupaceous fruits, the combination of: a pair of flexible dividing loops; and means for drawing said loops through the fruit in such a manner that said loops will pass upon opposite sides of the stone of said fruit.

28. In a machine for halving drupaceous fruits, the combination of: a pair of flexible dividing loops; and means for drawing said loops through the fruit in such a manner that the central portion of said loops will pass upon opposite sides of the stone of said fruit and the side portions of said loops adjacent to said central portions will pass together through the meat of said fruit.

29. In a machine for halving drupaceous fruits, the combination of: a pair of flexible dividing loops; means for drawing said loops through the fruit in such a manner that the central portion of said loops will pass upon opposite sides of the stone of said fruit and the side portions of said loops adjacent to said central portions will pass together through the meat of said fruit, and means for constricting said loops as they are drawn through said fruit.

30. In a machine for halving drupaceous fruits, the combination of: a pair of flexible dividing loops; an incisor for incising and holding the fruit; and means for drawing said loops into the incision thus formed and through the fruit in such a manner that said loops will pass upon opposite sides of the stone of said fruit.

31. In a machine for halving drupaceous fruits, the combination of: a pair of flexible dividing loops; an incisor for incising and holding the fruit; means for drawing said loops into the incision thus formed and through the fruit in such a manner that the central portion of said loops will pass upon opposite sides of the stone of said fruit and the side portions of said loops adjacent to said central portions will pass together through the meat of said fruit; and means for constricting said loops as they are drawn through said fruit.

32. In a machine for halving drupaceous fruits, the combination of: a pair of flexible dividing loops; means for drawing said loops through the fruit in such a manner that said loops will pass upon opposite sides of the stone of said fruit; and means for advancing the wires forming said loops at each operation of said machine.

33. In a machine for halving drupaceous fruits, the combination of: a pair of flexible dividing loops; means for drawing said loops through the fruit in such a manner that the central portion of said loops will pass upon opposite sides of the stone of said fruit and the side portions of said loops adjacent to said central portions will pass together through the meat of said fruit; means for constricting said loops as they are drawn through said fruit; and means for advancing the wires forming said loops at each operation of said machine.

34. In a machine for halving drupaceous fruits, the combination of: a pair of flexible dividing loops; means for drawing said loops through the fruit in such a manner that said loops will pass upon opposite sides of the stone of said fruit; and a retractor element attached to the central portion of each of said loops, for returning said loops after each cutting operation thereof.

35. In a machine for halving drupaceous fruits, the combination of: a pair of flexible dividing loops; means for drawing said loops through the fruit in such a manner that the central portion of said loops will pass upon opposite sides of the stone of said fruit and the side portions of said loops adjacent to said central portions will pass together through the meat of said fruit; means for constricting said loops as they are drawn through said fruit; means for advancing the wires forming said loops at each operation of said machine; and a retractor element attached to the central portion of each of said loops, for returning said loops after each cutting operation thereof.

36. In a machine for halving and pitting drupaceous fruits, the combination of: a frame; a carriage reciprocably mounted upon said frame having a forward structure and a rearward structure; means for holding a fruit between said forward and said rearward structure; and flexible members between said structures, adapted to be drawn through a fruit supported by said means.

37. In a machine for halving and pitting drupaceous fruits, the combination of: a frame; a carriage reciprocably mounted upon said frame having a forward structure and a rearward structure; means for holding a fruit between said forward and said rearward structure; flexible members supported between said structures, adapted to be drawn through a fruit supported by said means; and guides for directing said flexible members through said fruit in such a manner as to cut said fruit upon a substantially central plane.

38. In a machine for halving and pitting drupaceous fruits, the combination of: a frame; a carriage reciprocably mounted upon said frame having a forward structure and a rearward structure; means for holding a fruit between said forward and said rearward structure; flexible members supported between said structures, adapted to be drawn through a fruit supported by said means; and guides for directing said flexible members through said fruit in such a manner that the central portions of said flexible members will pass over opposite sides of the stone of said fruit, and the side portions of said flexible members will pass through the meat of the fruit in a substantially central plane, so as to divide the fruit and free the stone therefrom.

39. In a machine for halving and pitting drupaceous fruits, the combination of: a frame; a carriage reciprocably mounted upon said frame having a forward structure and a rearward structure; means for holding a fruit between said forward and said rearward structure; flexible members supported between said structures, adapted to be drawn through a fruit supported by said means; guides for directing said flexible members through said fruit in such a manner that the central portions of said flexible members will pass over opposite sides of the stone of said fruit, and the side portions of said flexible members will pass through the meat of the fruit in a substantially central plane, so as to divide the fruit and free the stone therefrom; and a stationary member against which said fruit is forced during the cutting action of said flexible member.

40. In a machine for halving and pitting drupaceous fruits, the combination of: a frame; a carriage reciprocably mounted upon said frame having a forward structure and a rearward structure; means for holding a fruit between said forward and said rearward structure; a pair of wires mounted upon said rearward structure with the ends thereof rearwardly directed and the curved portions between the ends thereof extending forwardly from said rearward structure toward said forward structure in the form of loops; means linking the centers of said loops with said forward structure; and means for guiding said loops through said fruit as said carriage is reciprocated.

41. In a machine for halving and pitting drupaceous fruits, the combination of: a frame; a carriage reciprocably mounted upon said frame having a forward structure and a rearward structure; means for holding a fruit between said forward and said rearward structure; a pair of wires mounted upon said rearward structure with the ends thereof rearwardly directed and the curved portions between the ends thereof extending forwardly from said rearward structure toward said forward structure in the form of loops; means linking the centers of said loops with said forward structure; means for guiding said loops through said fruit as said carriage is reciprocated; and means for advancing said wires so as to gradually renew said loops.

42. In a machine for halving and pitting drupaceous fruits, the combination of: a frame; a carriage reciprocably mounted upon said frame having a forward structure and a rearward structure; means for holding a fruit between said forward and said rearward structure; a pair of wires mounted upon said rearward structure with the ends thereof rearwardly directed and the curved portions between the ends thereof extending forwardly from said rearward structure toward said forward structure in the form of loops; means linking the centers of said loops with said forward structure; a stationary member disposed between said forward structure and said rearward structure having a slot therein through which said loops extend and against which said fruit is forced by the cutting action of said loops; and means for constricting said loops as they are drawn through said fruit.

43. In a machine for halving and pitting drupaceous fruits, the combination of: a frame; a carriage reciprocably mounted upon said frame having a forward structure and a rearward structure; means for holding a fruit between said forward and said rearward structure; a pair of wires mounted upon said rearward structure with the ends thereof rearwardly directed and the curved portions between the ends thereof extending forwardly from said rearward structure toward said forward structure in the form of loops; means linking the centers of said loops with said forward structure; a stationary member disposed between said forward structure and said rearward structure having a slot therein through which said loops extend and against which said fruit is forced by the cutting action of said loops; tucker bars slidably disposed in said stationary structure having eyes in the ends thereof through which said wires forming said loops pass; and means for moving said tucker bars together as said loops are drawn through said fruit.

44. In a machine for halving and pitting drupaceous fruits, the combination of: a frame; a carriage reciprocably mounted upon said frame having a forward structure and a rearward structure; means for holding a fruit between said forward and said rearward structure; a pair of wires mounted upon said rearward structure with the ends thereof rearwardly directed and the curved portions between the ends thereof extending forwardly from said rearward structure toward said forward structure in the form of loops; means linking the centers of said loops with said forward structure; a stationary member disposed between said forward structure and said rearward structure having a slot therein through which said loops extend and against which said fruit is forced by the cutting action of said loops; tucker bars slidably disposed in said stationary structure having eyes in the ends thereof through which said wires forming said loops pass; tucker cams mounted upon said rearward structure; tucker levers operating between said cams and said tucker bars for moving together said tucker bars as said loops are drawn through said fruit; and means for advancing said wires at each reciprocation of said carriage so as to renew said loops.

45. In a machine for halving and pitting drupaceous fruits, the combination of: a frame; a carriage reciprocably mounted upon said frame having a forward structure and a rearward structure; means for holding a fruit between said forward and said rearward structure, said means including an impaler bar supported upon said forward structure, a pit finder upon the end of said bar, and incisor blades mounted upon said impaler bar; means for spreading said incisor blades during the return stroke of said carriage; and flexible members between said structures, adapted to be drawn through a fruit supported by said means.

46. In a machine for halving and pitting drupaceous fruits, the combination of: a frame; a carriage reciprocably mounted upon said frame having a forward structure and a rearward structure; means for holding a fruit between said forward and said rearward structure, said means including an impaler bar frictionally supported upon said forward structure, a pit finder comprised of a pair of spring blades adapted to be forced into said fruit, a pair of incisor levers swingably supported upon said impaler bar, and incisor blades upon said levers adapted to come together in a plane to form an incisor element over which said fruit is forced; cam means for operating said levers in a manner to spread apart said incisor blades during the return movement of said carriage; flexible members supported between said structures, adapted to be drawn through a fruit supported by said means; and guides for directing said flexible members through said fruit in such a manner that the central portions of said flexible members will pass over each side of the stone of said fruit, and the side portions of said flexible members will pass through the meat of the fruit in a substantially central plane, so as to divide the fruit and free the stone therefrom.

47. In a machine for halving and pitting drupaceous fruits, the combination of: a frame; a carriage reciprocably mounted upon said frame having a forward structure and a rearward structure; means for holding a fruit between said forward and said rearward structure, said means including an impaler bar frictionally supported upon said forward structure, a pit finder comprised of a pair of spring blades adapted to be forced into said fruit, a pair of incisor levers swingably supported upon said impaler bar, and incisor blades upon said levers adapted to come together in a plane to form an incisor element over which said fruit is forced; cam means for operating said levers in a manner to spread apart said incisor blades during the return movement of said carriage; a pair of wires mounted upon said rearward structure with the ends thereof rearwardly directed and the curved portions between the ends thereof extending forwardly from said rearward structure toward said forward structure in the form of loops; means linking the centers of said loops with said forward structure; a stationary member disposed between said forward structure and said rearward structure having a slot therein through which said loops extend and against which said fruit is forced by the cutting action of said loops; tucker bars slidably disposed in said stationary structure having eyes in the ends thereof through which said wires forming said loops pass; tucker cams mounted upon said rearward structure; tucker levers operating between said cams and said tucker bars for moving together said tucker bars as said loops are drawn through said fruit; and means for advancing said wires at each reciprocation of said carriage so as to renew said loops.

48. In a machine for halving and pitting drupaceous fruits, the combination of: a frame; a carriage reciprocably mounted upon said frame having a forward structure and a rearward structure; means for holding a fruit between said forward and said rearward structure; flexible members between said structures, adapted to be drawn through a fruit supported by said means; and means for removing the tip from said fruit.

49. In a machine for halving and pitting drupaceous fruits, the combination of: a frame; a carriage reciprocably mounted upon said frame having a forward structure and a rearward structure; means for holding a fruit between said forward and said rearward structure, said means including an impaler bar frictionally supported upon said forward structure, a pit finder comprised of a pair of spring blades adapted to be forced into said fruit, a pair of incisor levers swingably supported upon said impaler bar, and incisor blades upon said levers adapted to come together in a plane to form an incisor element over which said fruit is forced; cam means for operating said levers in a manner to spread apart said incisor blades during the return movement of said carriage, a pair of wires mounted upon said rearward structure with the ends thereof rearwardly directed and the curved portions between the ends thereof extending forwardly from said rearward structure toward said forward structure in the form of loops; means linking the centers of said loops with said forward structure; a stationary member disposed between said forward structure and said rearward structure having a slot therein through which said loops extend and against which said fruit is forced by the cutting action of said loops; tucker bars slidably disposed in said stationary structure having eyes in the ends thereof through which said wires forming said loops pass; tucker cams mounted upon said rearward structure; tucker levers operating between said cams and said tucker bars for moving together said tucker bars as said loops are drawn through said fruit; means for advancing said wires at each reciprocation of said carriage so as to renew said loops; and means upon said stationary member for removing the tip from said fruit as it is forced against said stationary member by the cutting action of said loops.

50. In a machine for halving and pitting drupaceous fruits, the combination of: a frame; a carriage reciprocably mounted upon said frame having a forward structure and a rearward structure; means for holding a fruit between said forward and said rearward structure, said means including an impaler bar frictionally supported upon said forward structure, a pit finder comprised of a pair of spring blades adapted to be forced into said fruit, a pair of incisor levers swingably supported upon said impaler bar, and incisor blades upon said levers adapted to come together in a plane to form an incisor element over which said fruit is forced; cam means for operating said levers in a manner to spread apart said incisor blades during the return movement of said carriage, a pair of wires mounted upon said rearward structure with the ends thereof rearwardly directed and the curved portions between the ends thereof extending forwardly from said rearward structure toward said forward structure in the form of loops; flexible members linking the centers of said loops with said forward structure; cam means permitting a forward movement of said flexible linking members relative to said carriage during the cutting stroke of said carriage; a stationary member disposed between said forward structure and said rearward structure having a slot therein through which said loops extend and against which said fruit is forced by the cutting action of said loops; tucker bars slidably disposed in said stationary structure having eyes in the ends thereof through which said wires forming said loops pass; tucker cams mounted upon said rearward structure; tucker levers operating between said cams and said tucker bars for moving together said tucker bars as said loops are drawn through said fruit; means for advancing said wires at each reciprocation of said carriage so as to renew said loops; and means upon said stationary member for removing the tip from said fruit as it is forced against said stationary member by the cutting action of said loops.

51. In a machine for halving drupaceous fruits, the combination of: a flexible member; means for drawing said flexible member through a fruit; a guide means for guiding said flexible member in such a manner that it will pass across and follow the surface of the stone in said fruit in substantial contact therewith.

52. In a machine for halving drupaceous fruits, the combination of: a pair of flexible dividing members; and means for drawing said members through the fruit in such a manner that said members will pass upon opposite sides of the stone in said fruit.

53. In a machine for halving drupaceous fruits, the combination of: a pair of flexible dividing members; and means for drawing said members simultaneously through the fruit in such a manner that said members will pass upon opposite sides of the stone in said fruit.

54. In a machine for halving drupaceous fruits, the combination of: a pair of flexible dividing members; and means for drawing said members diametrally through the fruit in such a manner that the central portion of each one of said members will pass upon an opposite side of the stone in said fruit and the side portions of said members adjacent to said central portions will pass together in the same plane through said fruit.

55. In a machine for halving drupaceous fruits, the combination of: a pair of flexible dividing members; means for drawing said members diametrally through the fruit in such a manner that the central portion of each one of said members will pass upon an opposite side of the stone in said fruit and the side portions of said members adjacent to said central portions will pass together in the same plane through said fruit; means for guiding said members over said stone; and means for lifting said members free of said guiding means after said members have passed through said fruit.

56. In a wire advancing mechanism, the combination of: a pair of clamps adapted to prevent the movement of said wire in one direction; means for depressing the wire between said clamps and causing it to be drawn through one of said clamps; and means for drawing the wire out through the other of said clamps after the lifting of said depressing means.

57. In a machine for halving drupaceous fruits, the combination of: a pair of flexible dividing loops; means for drawing said loops through the fruit in such a manner that one of said loops will pass upon each side of the stone of said fruit; means for removing the tip from the fruit; and a retractor element attached to the central portion of each of said loops, for returning said loops after each cutting operation thereof.

58. The method of preparing drupaceous fruits which includes drawing a flexible member through the fruit in such a manner that the flexible member passes across and follows the contour of the stone in substantial contact with the surface thereof.

59. The method of preparing drupaceous fruits which includes drawing flexible dividing members through the fruit in such manner that the loops are passed simultaneously around opposite sides of the stone thereof and follow the contour of the stone as they pass thereover.

60. The method of preparing drupaceous fruit which includes: incising one side of the fruit; drawing flexible dividing members into the incision, thus formed, and centrally across the fruit; and guiding said flexible members in such a manner that one of said members passes around one side of the stone and the other of said members passes around the other side of said stone.

61. In a machine for halving drupaceous fruit: a flexible dividing member formed of wire; means for passing said dividing member entirely through the fruit and across the surface of the stone therein; and means for advancing the wire forming the dividing member.

62. In a machine for halving drupaceous fruit, the combination of: a pair of flexible dividing loops formed of wire; means for drawing said loops through the fruit in such a manner that said loops will pass upon opposite sides of the stone of said fruit; and means for periodically advancing the wire forming said loops.

62. In a machine for halving drupaceous fruit, the combination of a flexible wire means for drawing said wire entirely through the fruit and across the surface of the stone therein; and means for tipping the fruit.

In testimony whereof, I have hereunto set my hand at Los Angeles, California, this 30th day of December 1922.

GEORGE WILCOX.